United States Patent [19]
Rottler et al.

[11] Patent Number: 4,789,279
[45] Date of Patent: Dec. 6, 1988

[54] SYSTEM AND APPARATUS FOR REBORING MAIN BEARINGS

[76] Inventors: Donald B. Rottler, 101 NE. 58th St., #8, Seattle, Wash. 98107; David Engnell, 975 Wildwood Blvd. Southwest, Issaquah, Wash. 98027

[21] Appl. No.: 63,553

[22] Filed: Jun. 18, 1987

[51] Int. Cl.$^4$ .............................................. B23Q 3/06
[52] U.S. Cl. .................................... 409/227; 409/219; 409/903; 269/296; 408/108; 408/708
[58] Field of Search ................. 408/87, 103, 108, 708, 408/54; 409/163, 164, 167, 174, 219, 225, 227, 903; 269/99, 296; 108/144, 148; 248/188.2

[56] References Cited

U.S. PATENT DOCUMENTS

| | | | |
|---|---|---|---|
| Re. 31,859 | 4/1985 | Aldridge, Jr. | 408/708 |
| 1,295,157 | 2/1919 | Hanson | 409/219 |
| 2,250,788 | 7/1941 | Arp | 408/708 |
| 2,544,822 | 3/1951 | Brown | 248/188.2 |
| 2,648,999 | 8/1953 | Stephan | 409/219 |
| 3,295,418 | 1/1967 | Chiaia | 409/227 |

FOREIGN PATENT DOCUMENTS 2424516  6/1975  Fed. Rep. of Germany ... 248/188.2

Primary Examiner—Gil Weidenfeld
Assistant Examiner—Daniel W. Howell
Attorney, Agent, or Firm—Seed and Berry

[57] ABSTRACT

An engine block reboring system for main bearings in which the block is mounted on a pair of rails extending laterally on a workbed and is rebored by a tool driven by a right-angle drive extension on a vertical boring machine after the position of the block has been adjusted so that the vertical axis of the boring machine spindle and the desired reboring axis are in the same vertical plane, and the proper height for the tool is set for reference, so that the bearings can be rebored by manipulating the spindle vertically and horizontally in said vertical plane with respect to the height reference. Apparatus is provided for initially properly aligning the block and keeping it in aligned position during the reboring operation.

10 Claims, 4 Drawing Sheets

SYSTEM AND APPARATUS FOR REBORING MAIN BEARINGS

DESCRIPTION

1. Technical Field

The present invention relates to an improved technique for reboring the main bearings of used engine blocks and to apparatus for mounting the blocks on a workbed during the reboring operation.

2. Background Art

To accurately rebore the main bearings in an engine block, it is essential that the rotary axis of the boring tool be parallel with the original center axis of each bearing. In normal practice, the reboring axis is slightly offset toward the bearing caps from the original axis so that a minimum of material will be removed from the engine block during the reboring operation. To make this possible, the bearing caps are removed and their flat faces, which engage the engine block, are milled slightly so that when the caps are again mounted on the block, the caps contain slightly less than a half circle. By this procedure, a major part of the material removed during the reboring operation will be removed from the bearing caps when the reboring axis is slightly offset toward the caps from the original axis of the bearings.

In the past, it has been common to rebore main bearings by special line boring machines in which a horizontal boring bar is journaled on a pair of aligned adjustable pedestals mounted on a workbed. The engine block is adjustably clamped to the workbed between the pedestals, and the boring bar is passed axially through the bearings and pedestals. Then the pedestals and the position of the block are adjusted to properly align the boring bar relative to the bearings.

The boring bar has a series of tool holes therealong for mounting a cutter head on the boring bar. A drive mechanism for the boring bar is provided which is also adjustable in position relative to the workbed. The boring bar is rotated by the drive mechanism and advanced to move the cutter head axially through a bearing, and then the cutter head is moved to another location on the boring bar for reboring the next bearing.

The present invention aims to provide an improved system and apparatus whereby a cylinder boring machine with a vertical spindle can also be used to rebore the main bearings of an engine block being reconditioned.

3. Disclosure of the Invention

In carrying out the invention, there is provided engine mounting apparatus including two rails which are secured in parallel transverse relation to the workbed. These rails have opposed sets of adjustable clamping devices mounted thereon for gripping an engine block. One of the rails has a wedge along one side thereof which is longitudinally adjustable on a sloped face so that the elevation of the upper surface of the wedge is adjustable relative to the upper surface of the second rail. The engine block is seated on the upper face of the wedge and the upper face of the second rail.

The positions of the clamping devices are vertically adjustable and horizontally adjustable along the rails. The engine-engaging clamping element of one of the clamping devices of each set is spring loaded.

The vertical cylinder boring machine has added thereto a right-angle drive unit mounted on the bottom of the spindle in place of the cylinder boring tool. This drive unit provides a horizontal output shaft driven via bevel gears and is positioned so that the output shaft is not only horizontal, but is also parallel with the length of the workbed. This position is maintained during vertical adjustment of the output shaft while the process is being carried out of aligning the shaft with the reboring axis of the main bearings of the engine block, which is secured on the related mounting apparatus.

When alignment of the reboring axis of the main bearings relative to the boring axis of the right angle drive has been completed, the vertical setting of the spindle is noted. Reboring of a bearing is accomplished by advancing the boring spindle horizontally, lengthwise of the workbed, or moving the workbed longitudinally, while powering the horizontal output shaft of the right angle drive attachment to the spindle. Then the cutting tool or the workbed can be horizontally retracted and the spindle raised to clear the block for repositioning at the noted vertical setting between the last bearing rebored and the next bearing in the line.

BEST MODE FOR CARRYING OUT THE INVENTION

Figure 1:
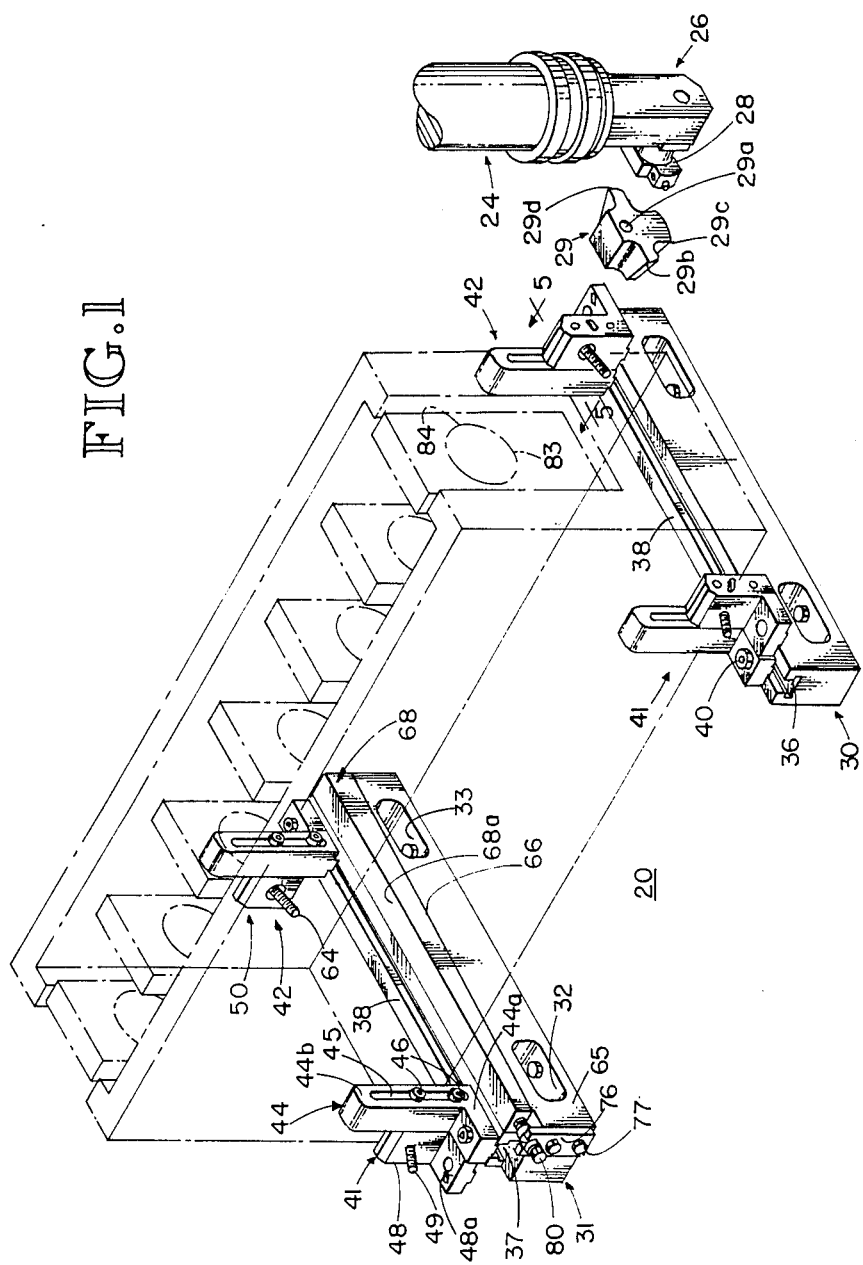
FIG. 1 is a perspective view showing the engine block mounting apparatus of the present invention in operative position, together with a right-angle spindle extension having a boring tool attached and showing a centering half-cone detached.
Figure 2:
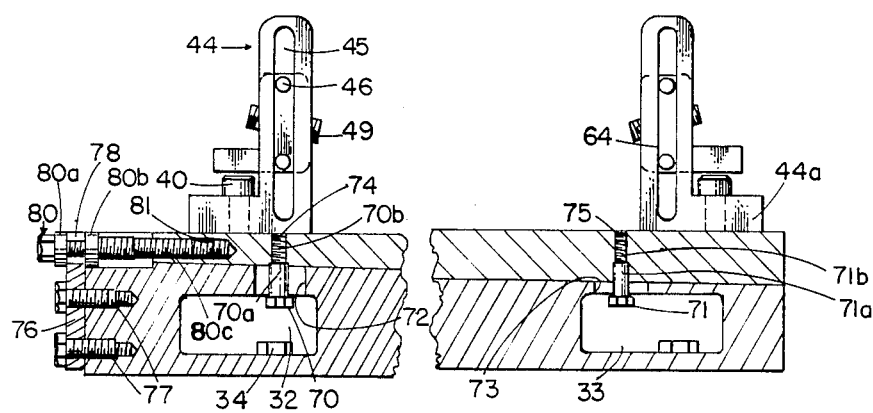
FIG. 2 is a fragmentary side elevational view of the left rail assembly.
Figures 3, 4:
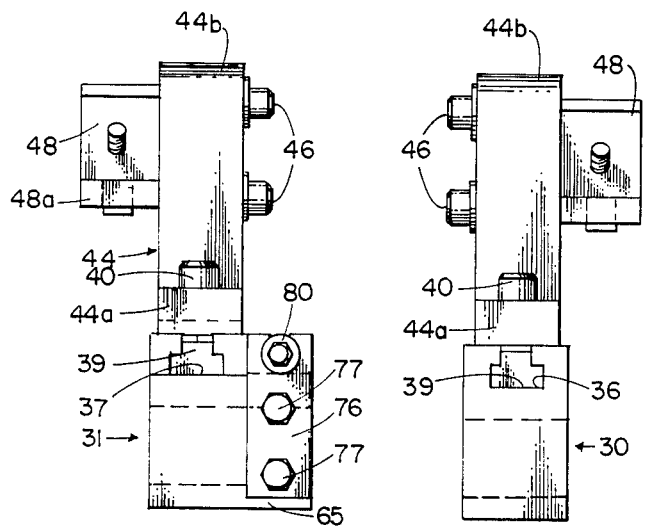
FIGS. 3 and 4 are front views of the left nd right rail assemblies, respectively.
Figure 5:
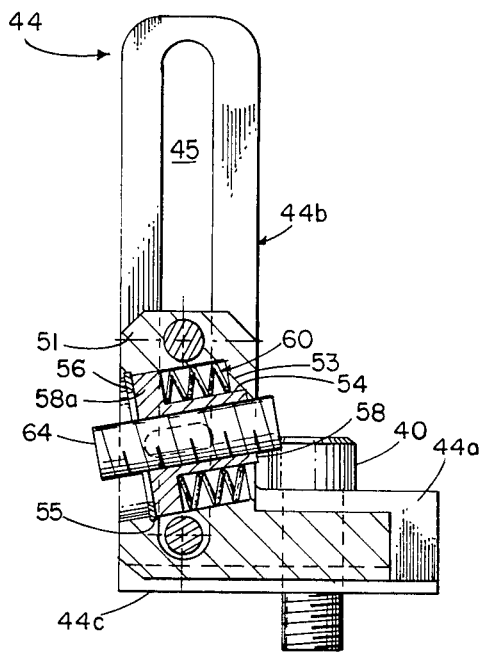
FIG. 5 is a vertical sectional view taken as indicated by line 5—5 of FIG. 1.
Figure 6:
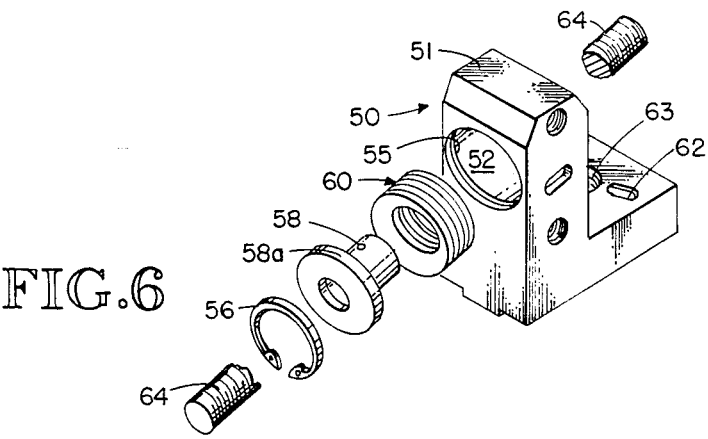
FIG. 6 is an exploded view of one of the rear clamping units.

Referring to the drawings, the apparatus of the invention is intended for use on a rigid horizontal workbed 20 having parallel longitudinal keyways 21, 22 therealong. For purposes of discussion, the length of the workbed will define the X-axis, the width of the workbed will define the Y-axis, and the Z-axis will be vertical to the plane of the workbed. The workbed is related to a vertically adjustable vertical spindle 24 on a cylinder boring machine which may be of the type shown in pending United States application Ser. No. 004,809, filed Jan. 9, 1987, in which the workbed is stationary and the vertically adjustable spindle is also adjustable on the X and Y axes relative to the workbed, or a reboring machine of the type in which the workbed 20 is adjustable on the X and Y axes relative to the spindle. In either instance, instead of the boring tool rotating about the Z-axis, the spindle is provided with a right-angle extension 26, with a bevel gear drive therein having an output shaft directed on the X-axis for driving a reboring tool 28. As will later be discussed, a centering half-cone 29 may be mounted on the output shaft in place of the reboring tool 28 to assist in initial positioning of an engine block on the engine mounting apparatus of the present invention.

The apparatus includes two parallel rails 30, 31 adapted to be mounted on the workbed 20 in transverse relation thereto for supporting an engine block. Both rails have a pair of elongated cutouts 32, 33 therethrough for giving access to respective hold-down bolts 34 extending downwardly into threaded engagement with inverted T-bolts 35 riding as keys in the keyways 21, 22 in the workbed. The rails 30, 31 are also formed with a respective keyway 36, 37 exposed to their upper surface 38 and extending parallel to the Y-axis. These keyways 36, 37 in turn receive inverted T-nuts 39 as keys which have hold-down bolts 40 threaded thereinto. These bolts 40 extend through the bases of front and rear pairs of clamp units 41—41 and 42—42. Each clamp unit has a like generally L-shaped clamp support member 44 having a horizontal mounting foot 44a with a vertical bore receiving the respective hold-down bolt 40, and having an upright leg 44b formed with a through-slot 45 therealong for receiving a pair of heightadjustment bolts 46. The sole of the mounting foot 44a is stepped to provide a rectangular guide 44c fitting into the mouth of the related keyway 36, 37 for preventing turning of the clamp support member 44 relative to the related rail 30, 31. The front heightadjustment bolts 46 are threaded into respective front clamping ears 48, each having a clamping screw element 49 threaded therethrough which slopes downwardly to the rear and has an allen head at the front. Similarly, the back bolts 46 are threaded into respective back clamping ears 50 arranged to oppose the front clamping ears 48.

The housing 51 of each of the back clamping ears 50 has a cylindrical chamber 52 open at the front and having an annular shoulder 53 at the rear surrounding an exit bore 54. Adjacent its forward end, the chamber 52 has an annular groove 55 receiving a snap-ring 56 serving as a forward stop for the enlarged circular head 58a of an internally threaded thrust element 58. The latter extends into the exit bore 54 and is urged forwardly against the snap-ring 56 by a series of spring washers 60 positioned between the head 58a and the shoulder 53. A slide pin 62 extends through a side slot 63 in the housing 51 and radially into the head 58a to prevent rotation of the thrust element 58, the length of the slot 63 being parallel to the axis of the chamber 52. Extending axially through the thrust element 58 in threaded engagement therewith is a clamping screw element 64 which has an allen head at the rear. This clamping element slopes downwardly toward the front and normally projects forwardly beyond the related ear 50 and clamp support member 44 in opposition to the respective front clamping screw element 49.

The rail 31 has a lateral extension 65 therealong which is formed with a sloped upper face 66 which slopes downwardly toward the rear and is stepped downwardly from the adjacent upper face 38 of the rail. An elongated wedge 68 seats on the sloped face 66 and is kept in alignment by a pair of alignment cap screws 70, 71 which extend by unthreaded shank portions 70a, 71a from their heads in the elongated cutouts 32, 33 upwardly through slots 72, 73 in the lateral extension 65. Then the alignment screws neck to threaded portions 70b, 71b, which screw into aligned threaded bores 74, 75 in the wedge 68. The lower ends of these bores 74, 75 are counterbored to receive and serve as a stop for the unthreaded shank portions 70a, 71a of the alignment screws.

At its forward end, the lateral extension 65 of rail 31 has an upwardly projecting bracket 76 anchored thereto by a pair of cap screws 77. This bracket 76 has an upwardly exposed through-slot 78 opposing the forward end of the wedge 68 to form a fork for receiving a wedge-adjusting screw 80 having a pair of integral front and back thrust collars 80a, 80b opposing the front and rear faces, respectively, of the slotted upper portion of the bracket 76. The adjusting screw 80 has a threaded portion 80c received by a threaded end bore 81 in the wedge 68. The upper face 68a of the wedge is parallel with the bases and upper faces 38 of the rails 30, 31. When the wedge-adjusting screw 80 is retracted in the bore 81 by turning the head of the screw 80 counterclockwise, the rear thrust collar 80b bears against the back of the bracket 76, thereby causing the wedge 68 to slide rearwardly and responsively lower the upper face 68a thereof. In this regard, the upper face 38 of the rail 31 is purposely made lower than the upper face of the rail 30 so that an engine block will always bear directly on the wedge 68 when supported. When the wedge-adusting screw 80 is advanced in the bore 81 by turning the screw clockwise, the front thrust collar 80a bears against the front of the bracket 76, thereby causing the wedge 68 to slide forwardly and responsively raise the upper face 68a thereof. When the wedge 68 is being adjusted by operation of the screw 80, the wedge is kept in proper alignment by the shanks 70a of the screws 70 in cooperation with the slots 72, 73.

The clamping ears 48 preferably are provided with right-angle mounting flanges 48a which have a central opening matching that in the mounting feet 44a of the clamp support members 44. If space is limited by an engine block configuration such that there is not adequate room for the leg 44b of one or more of the clamp support members 44, the respective clamping ear 48 can be separated by backing off the screws 46, whereupon the clamping ear can be mounted directly on the rail 30 or 31 and secured by passing the corresponding hold-down bolt 40 through the mounting flange 48a into the underlying key nut 39. Like the mounting feet 44a, the soles of the mounting flanges 48a are stepped to provide a rectangular guide for fitting into the mouth of the related keyway 36, 37 to prevent turning of the clamping ear 48 relative to the related rail 30, 31 when the clamping ear 48 is mounted directly on the rail.

To mount an in-line engine block on the fixture after the rails have been anchored on the workbed 20 in the desired location by tightening down the hold-down bolts 34, the engine block is lowered onto the rails in an approximately centered relation. Then the clamping units 41, 42 on the rail 30 are mounted and adjusted so that the block appears to be aligned relative to the keyways 20, 21 along the workbed 20, and the rear clamping screw 64 and front clamping screw 49 engage the block. Preferably, the rear clamping screw 64 is adjusted relative to the thrust element 58 so as to be approximately axially centered in its travel range.

Assume for purposes of example that the reboring machine is of the type having a stationary workbed 20, such as shown in pending application Ser. No. 004,809, in which the spindle and right-angle drive 26 are set so that the drive axis of the output shaft is along the X-axis. The centering half-cone 29 is mounted on the output shaft by way of an upper bore 29a. Beneath this bore, the centering cone 29 has three tapered radial flutes 29b, c and d whose outer faces match the curvature of a frustoconical surface generated about the axis of the bore 29a. The maximum radius of the flutes is greater than the radius of the main bearing bores. The spindle is adjusted such that the axis of the centering cone 29 is approximately aligned with that of the main bearings, and then the centering cone is advanced into the bore of the adjacent end main bearing, with the flutes 29 b, c and d engaging the semicircular entry edge 83 of the engine block half of the bearing, as distinguished from the bearing cap portion 84 thereof. As this is being done, the clamping screw elements 49 are adjusted to shift the block, as required, and the wedge-adjusting screw 80 is turned, as required, to level the block. While making adjustments, it will be of assistance to move the centering half-cone 29 on the spindle to the bearing at the remote end of the block and to make further adjustments, as required, for entry of the half-cone into the bearings. The centering half-cone 29 is then removed and the boring tool 28 is applied to the output shaft of the extension 26. A final fine adjustment is then made while referring to a suitable indicator, applied as by a magnet to the end of the tool after it is advanced into the end bearings. When final adjustment is accomplished, the vertical setting of the spindle is noted for reference.

The reboring operation can then be performed by advancing the boring spindle into the bearings while at the reference height. After a bearing has been rebored and the boring tool has been retracted therefrom, the spindle is elevated from the reference height sufficiently for the tool to clear the bearing cap of the rebored bearing, and then the spindle is moved horizontally in the X-axis direction (or the workbed is moved) to a position where the drive extension 26 is directly above the gap between this bearing and the next one. The spindle is then lowered to the reference height and the next bearing is rebored. It will be apparent that the extension 26 and boring tool 28 must be compact enought to fit between the bearings.

Figure 7:
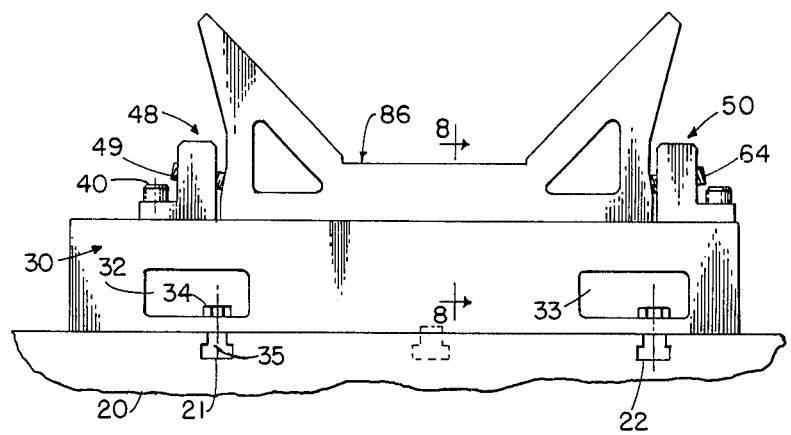
FIG. 7 is a side elevational view showing an alternative cradle mounting arrangement on the right-hand rail.
Figures 8, 9:
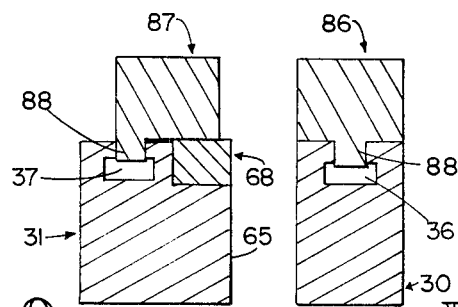
FIG. 8 is a vertical sectional view taken on line 8—8 of FIG. 7.
FIG. 9 is a vertical sectional view taken in the same manner as FIG. 8, but through a cradle mounted on the left rail.

For handling V-8 blocks, there are provided two cradles 86, 87. Cradle 86 is seated on the rail 30 and cradle 87 is seated on the wedge 68 and is wide enough to also overlie the upper face 38 of the rail 31, as shown in FIG. 9. In each instance, it is preferred to provide the cradle with a depending tongue 88 adapted to fit into the T-slot 37 to assist in positively positioning the cradles relative to the rails 30, 31. As shown in FIG. 7, the clamping ears 48 and 50 may be mounted directly on the rails to clamp the cradles in position. The V-blocks will be bolted or clamped to the cradles.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. Apparatus for supporting an engine block, comprising:
    a first rail having a first upper support surface;
    a second rail arranged in parallel spaced relation to the first rail;
    a vertically adjustable member carried by the second rail and having a second upper support surface higher than the second rail and parallel to said first upper support surface;
    adjusting means for adjusting the elevation of said member from a lowermost position whereat said second upper support surface is lower than the first upper support surface to an elevated position higher than the latter; and
    clamping means adjustably mounted on said rails.

2. Apparatus according to claim 1 in which said vertically adjustable member comprises a wedge slidably mounted on a complementing sloped surface on the second rail, and said adjusting means acts between the second rail and wedge.

3. Apparatus for supporting an engine block or cradle for an engine block, comprising:
    a rail having an upper track therealong through part of its width and having an upper longitudinally sloping slide face therealong beside the track;
    a wedge member having a sloped bottom face seated on said slide face and having an upper support face, the elevation of which is adjustable by endwise movement of the wedge member relative to the slide face on the rail;
    adjusting means acting between the rail and wedge member for selectively moving the wedge member longitudinally relative to the rail;
    two opposed clamping devices adjustably mounted on said track for gripping therebetween an engine block or cradle seated on said upper support surface of the wedge member; and
    hold-down means for locking said clamping devices to the rail at selected locations along the track.

4. Apparatus according to claim 3 in which said track has a keyway of inverted T-configuration therealong, and said hold-down means comprises nuts retained in said keyway and hold-down screws passing through said clamping devices into said nuts.

5. Apparatus according to claim 3 in which said rail has two lateral recesses therein located adjacent opposite ends thereof, and hold-down bolts extending downwardly through said rail from said recesses, with their heads exposed in the recesses.

6. Apparatus according to claim 3 in which said rail has a lateral recess therein and a vertical elongated slot extending from the recess to said sloping side face, and a screw passing upwardly through said slot into said wedge and having its head exposed in said lateral recess.

7. Apparatus according to claim 6 in which said rail has a hold-down bolt extending downwardly through the rail from said recess, with its head exposed in said recess.

8. Apparatus according to claim 3 in which said track has a keyway therealong with which said hold-down means interfits.

9. Apparatus according to claim 3 in which said adjusting means comprises a screw member threadably engaging one end of the wedge member and means holding the screw against endwise movement relative to the rail while permitting the screw to freely turn around its longitudinal axis relative to the rail.

10. Apparatus according to claim 9 in which said rail has an end bracket overlapping one end of the rail, said bracket having a slot opposite said one end of the rail, and said screw member extends through said slot and interfits with the end bracket.

* * * * *